(12) United States Patent
Convent et al.

(10) Patent No.: US 10,605,643 B2
(45) Date of Patent: Mar. 31, 2020

(54) FILL LEVEL SWITCH AND METHOD FOR DETERMINING A LIMIT LEVEL OF A MEDIUM IN A CONTAINER

(71) Applicant: KROHNE Messtechnik GmbH, Duisburg (DE)

(72) Inventors: Thomas Convent, Issum (DE); Robert Storch, Lüdenscheid (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 149 days.

(21) Appl. No.: 15/892,709

(22) Filed: Feb. 9, 2018

(65) Prior Publication Data

US 2018/0224316 A1    Aug. 9, 2018

(30) Foreign Application Priority Data

Feb. 9, 2017  (DE) .................. 10 2017 102 587

(51) Int. Cl.
| | |
|---|---|
| *G01F 23/284* | (2006.01) |
| *G01S 13/04* | (2006.01) |
| *H01Q 9/04* | (2006.01) |
| *G01S 7/41* | (2006.01) |
| *H01Q 1/22* | (2006.01) |

(52) U.S. Cl.
CPC ........ *G01F 23/284* (2013.01); *G01F 23/2845* (2013.01); *G01S 7/412* (2013.01); *G01S 13/04* (2013.01); *H01Q 1/225* (2013.01); *H01Q 9/0407* (2013.01)

(58) Field of Classification Search
None
See application file for complete search history.

(56) References Cited

U.S. PATENT DOCUMENTS

| | | | |
|---|---|---|---|
| 6,842,140 B2 | 1/2005 | Killen et al. | |
| 7,589,676 B2 | 9/2009 | Popugaev et al. | |
| 7,692,588 B2 | 4/2010 | Beer et al. | |
| 7,712,381 B2 | 5/2010 | Allenberg et al. | |
| 7,863,728 B2 | 1/2011 | Beer et al. | |
| 8,474,314 B2 | 7/2013 | Neuburger et al. | |
| 9,851,235 B2 | 12/2017 | Blodt | |
| 9,851,236 B2 | 12/2017 | Baer et al. | |

(Continued)

FOREIGN PATENT DOCUMENTS

DE   10 2005 048 274 A1   4/2007

*Primary Examiner* — Paresh Patel
(74) *Attorney, Agent, or Firm* — David S. Safran; Roberts Calderon Safran & Cole, P.C.

(57) ABSTRACT

A fill level switch for determining a level limit of a medium in a container, has a sensor unit having an antenna unit, a process window for protecting the sensor unit and for connection to a container wall, an electronic unit and a sensor housing. The antenna unit has at least a first emitting element for emitting a first electromagnetic transmission signal, at least a feed line, at least a reference surface having a reference potential and at least a dielectric layer, wherein the dielectric layer is arranged between the reference surface and the emitting element. An aperture coupling is provided via which the emitting element is fed by the feed line during operation. The reference surface has an opening for passage of the electromagnetic transmission signal, and the first emitting element is arranged such that it has direct contact with the medium during operation.

17 Claims, 6 Drawing Sheets

(56) References Cited

U.S. PATENT DOCUMENTS

| | | | |
|---|---|---|---|
| 2004/0046573 A1* | 3/2004 | Schroth | G01F 23/284 |
| | | | 324/644 |
| 2009/0229359 A1* | 9/2009 | Reimelt | G01F 23/284 |
| | | | 73/304 R |
| 2013/0207274 A1 | 8/2013 | Liu et al. | |
| 2013/0314275 A1* | 11/2013 | Fredriksson | G01F 23/284 |
| | | | 342/124 |
| 2014/0125512 A1* | 5/2014 | Janitch | G01F 23/284 |
| | | | 342/124 |
| 2016/0202105 A1 | 7/2016 | Baer et al. | |

* cited by examiner

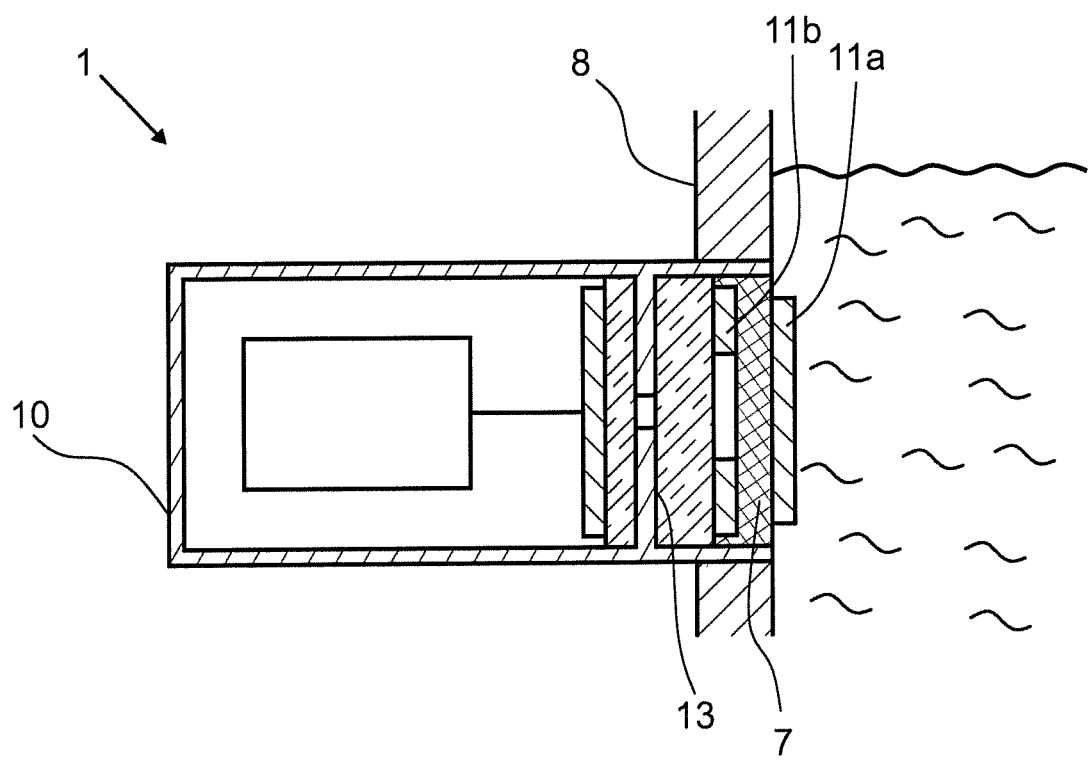
Fig. 7
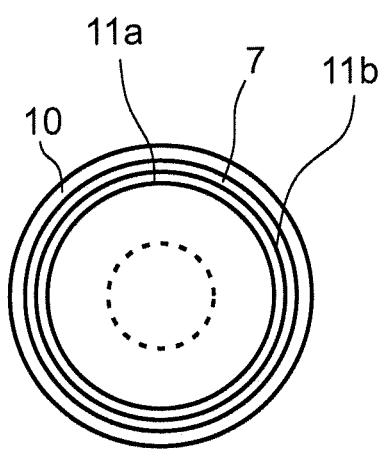 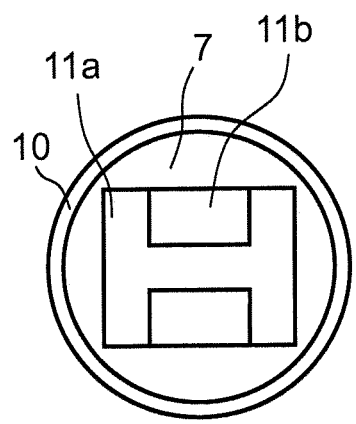
Fig. 8a          Fig. 8b

FILL LEVEL SWITCH AND METHOD FOR DETERMINING A LIMIT LEVEL OF A MEDIUM IN A CONTAINER

BACKGROUND OF THE INVENTION

Field of the Invention

The invention relates to a fill level switch for determining a limit level of a medium in a container having at least a sensor unit, wherein the sensor unit has at least an antenna unit, at least a process window for protecting the sensor unit and for connection to the container wall, at least an electronic unit and at least one sensor housing, wherein the antenna unit has at least a first emitting element for emitting a first electromagnetic transmission signal, at least a feed line, at least a reference surface having a reference potential, preferably a defined ground plane and at least a dielectric layer, wherein the dielectric layer is arranged between the reference surface and the emitting element.

In addition, the invention is based on a method for determining a limit level of a medium in a container with a fill level switch having at least a sensor unit, wherein the sensor unit has at least an antenna unit, at least a process window for protecting the sensor unit and for connection to the container wall, at least an electronic unit and at least a sensor housing, wherein the antenna unit has at least a first emitting element for emitting a first electromagnetic transmission signal, at least a feed line and at least a reference surface having a reference potential, preferably a defined ground plane and at least a dielectric layer, wherein the dielectric layer is arranged between the reference surface and the emitting element.

It is known from the prior art to use different sensors for detecting a limit level of a medium in a container, for example for overflow or dry run protection. By way of example only, vibrating fork sensors, capacitive sensors, conductive sensors or ultrasonic sensors may be mentioned here.

Sensors that determine the limit level of a medium by interaction of the medium with an electromagnetic signal are also known. On the one hand barrier sensors are known that have an emitting element, wherein the emitting element emits an electromagnetic signal through the container or through the medium in the direction of a receiver and wherein the presence of the medium or reaching the limit level is determined by the attenuation of the electromagnetic signal.

Furthermore, the change in the near field of the sensor due to the presence of a medium can be determined with a reflection sensor. For this, an electromagnetic signal is preferably fed into the emitting element for a defined period of time, which is emitted by the emitting element into the container, wherein the power reflected at the emitting element is determined either at a defined frequency or in a frequency interval. With the help of a directional coupler, the signal to be fed in is separated from the returning reflection signal. The presence of a medium causes a change in the reflected power over the frequency due to the change in the dielectric constant. In this respect, both reaching an upper limit level, i.e., the transition from air to medium, as well as reaching a lower limit level, i.e., the transition from medium to air, can be monitored with this method. The evaluation of the reflected power in a frequency interval offers the advantage that a distinction between media of different dielectric constant is particularly simple and reliable.

Both barrier and reflection sensors are separated from the container interior during operation by a process window. Such a process window fulfills, in particular, the following tasks and requirements:

The process window is made of a material transparent for the frequency of the electromagnetic transmission signal.

The process window has the lowest possible dielectric constant in order to keep the signal attenuation low and thus the sensitivity high.

The process window is as thin as possible in order to keep the signal attenuation low and thus the sensitivity high.

Description of Related Art

European Patent Application EP 3 045 879 A1 and corresponding U.S. Patent Application Publication 2016/0202105 A1 disclose a fill level switch with a signal conductor arrangement arranged on a carrier element, wherein the signal conductor arrangement has a plurality of emitting devices, for example in the form of patch antennas, for emitting electromagnetic signals. Reaching a limit level is determined by the evaluation of the emission behavior of the emitting devices. In this case, the emitting elements can have either direct or indirect contact with the medium during operation.

The use of planar emitting elements, to which the electromagnetic transmission signal generated by the electronic unit is emitted through free space, i.e., in the container interior, has the advantage in the context of fill level determination that corresponding antenna arrangements are particularly easy to manufacture and, furthermore, are designed particularly space-saving and thus hardly protrude into the medium to be measured.

Various configurations of planar antenna arrangements are known from the prior art. In general, such an antenna arrangement consists of a round or rectangular antenna surface, which is backed with a ground surface, wherein both the antenna surface and the ground surface, and the ground surface and the feed line are separated by a dielectric layer.

The feeding of the antenna surface can be done either by direct contact via a line to the feed line, or alternatively, a so-called aperture coupling is also known. In this case, the feed line is not directly connected to the antenna surface, but the signal energy is electromagnetically coupled in the antenna surface through an opening in the ground surface. Usually, such antenna arrangements are implemented in multi-layer printed circuit board constructions.

For example, an aperture-coupled antenna arrangement is known from document German Patent Application DE 10 2005 010 895 A1 and corresponding U.S. Pat. No. 7,589,676 B2, wherein the ground surface has a combination of three slots for producing a circular polarization with high polarization purity and a high impedance bandwidth.

The German Patent Application DE 10 2005 048 274 A1 discloses a RADAR sensor arrangement, in particular for use in vehicles, wherein a patch antenna array is arranged on the upper side of the sensor, which is fed via a radiation coupling.

Moreover, German Patent DE 10 2004 057 087 B3 and corresponding U.S. Pat. No. 7,712,381 B2 disclose an antenna arrangement arranged in the wall of a pipeline for measuring a mass flow, wherein the antenna arrangement has curved patch elements arranged diametrically as transmitting and receiving elements, and wherein the microwave input and output takes place via a coupling hole. In this case, the patch elements are integrated into the inner wall of the pipe and thus have no direct contact with the medium during operation.

SUMMARY OF THE INVENTION

Based on the stated prior art, an object of the present invention is to provide a fill level switch, which has a particularly high sensitivity and, at the same time, is particularly robust. Furthermore, an object of the present invention is to provide a corresponding method for determining a limit level of a medium in a container.

According to a first teaching of the invention, the above-derived object is achieved by a fill level switch mentioned above in that the antenna unit is designed such that the emitting element is fed by the feed line via an aperture coupling during operation, wherein the reference surface has at least one opening as passage for the electromagnetic signal and that the first emitting element is arranged such that it is in direct contact with the medium during operation.

In the context of the present invention, the electromagnetic signal coupled into the container is preferably a microwave signal.

According to the invention, it has been recognized that an arrangement of the first emitting element brings about a particularly high sensitivity of the fill level switch in such a manner that it has direct contact with the medium during operation, for example when the limit level to be monitored is reached, so that the signal emitted by the emitting element can penetrate particularly deeply into the medium, whereby the detection of media with a particularly low dielectric constant is possible. If the power reflected by the emitting element is evaluated over the frequency, the measured frequency shift for a medium with a specific dielectric constant is significantly greater than a frequency shift measured with an arrangement in which the emitting element is arranged behind the process window viewed on the medium side. Although the thickness of the process window in the configuration according to the invention still has an influence on the measurement, it is no longer reciprocal to the sensitivity. Thus, the process window can be made particularly thick compared to the arrangements known from the prior art. Thus, it is possible to simultaneously ensure a particularly high pressure resistance and a particularly high resistance to chemically diffusion-friendly media of the fill level switch.

The use of an aperture coupling is advantageous in various respects in the present application. For example, a corresponding antenna arrangement can be produced in a particularly simple manner since it is possible to dispense of a through-connection to the emitting element, for example to the antenna surface.

According to one configuration, a dielectric layer is also present between the feed line and the reference surface.

According to an advantageous configuration of the fill level switch according to the invention, the emitting element is designed as a planar antenna surface or as an array of at least two planar antenna surfaces.

Moreover, it is advantageous when the dielectric layer arranged between the reference surface and the emitting element is designed as a process window. The emitting element can be applied particularly easily by coating on the process window or, if the process window is made of a plastic, such as PEEK or PTFE, by over-molding in the manufacturing process of the process window.

In this case, the process window is preferably designed such that it is permeable to the frequency of the electromagnetic transmission signal, and/or that the process window is at least partially made of plastic, glass or ceramic, particularly preferably made of PEEK or PTFE.

Electromagnetically, the aperture coupling is not limited to very thin ground planes, as is the case here on a printed circuit board assembly. According to a further configuration, therefore, a part of the sensor housing is designed as a reference surface, wherein the sensor housing has at least one opening in the region of the reference surface as passage for the electromagnetic signal. Preferably, the sensor housing according to this embodiment is at least partially made of metal. In this case, the sensor housing does not have a defined ground potential, but it may also have an indefinite reference potential. This configuration has the advantage that it is particularly resistant to high pressure loads.

According to a next configuration, the sensor housing can have a defined ground potential.

According to a further advantageous configuration, the antenna unit has at least a second emitting element, preferably a second planar antenna surface, for emitting a second electromagnetic transmission signal, wherein the first and the second emitting element are not arranged in a common plane. In this case, the statement that the two emitting elements are not arranged in a common plane means that they have a different distance to the medium during operation. Particularly preferably, the first emitting element is arranged in front of the process window on the medium side, and the second emitting element is arranged behind the process window.

Preferably, the second emitting element is arranged parallel to the first emitting element. A parallel arrangement in the present context means that the two emitting elements are arranged one behind the other viewed on the medium side.

Particularly preferably, the second emitting element is arranged between the process window and the reference surface. According to this configuration, a second emitting element is provided behind the process window, which has a lower sensitivity compared to the first emitting element. This configuration has the advantage that, in addition to media with low dielectric constants, media with widely differing, i.e., small and large, dielectric constants can be determined. In addition, strongly adhering media can be monitored, wherein a difference is to be made between adhesion and coverage of the sensor unit by the medium. In contrast to stacked antenna arrangements known from the prior art, the present arrangement is not used to increase the bandwidth of the antenna arrangement but to increase the sensitivity range. As a result, the sensor unit or the fill level switch can be used in a particularly versatile manner. Accordingly, the first and the second emitting element are designed such that the frequency difference of the first and the second transmission signal is only small. Due to the small frequency difference, the first and the second transmission signal can be distinguished in the evaluation.

According to a further preferred embodiment, the first emitting element and the second emitting element have different sizes and/or different shapes.

On the one hand, it can be implemented using individual design of the emitting elements that the frequencies of the first and second transmission signal differ slightly. On the other hand, the first and the second emitting element are preferably configured and arranged in such a manner that complete shadowing of the first emitting element arranged on the medium side is prevented by the second emitting element.

For example, the second emitting element is designed annular and the first emitting element has a solid surface. It is also conceivable that the first and/or the second emitting element is or are designed to be circular, rectangular, square or dumbbell-shaped or in any way polygonal or have an irregular geometry.

However, it is also conceivable that the two emitting elements have the same size and/or the same shape.

In addition, an adaptation of the two emitting elements can also be carried out by modifying the feed line and/or the opening of the reference surface.

According to a next configuration, the opening of the reference surface is slit-shaped or dumbbell-shaped or T-shaped. In addition, several spatially separate or interconnected openings may be present. If there are several openings, then the individual openings can be either identically or differently configured.

According to another configuration, the feed line is designed T-shaped or dumbbell-shaped. If more than one feed line is present, then the individual feed lines can be either identically or differently configured.

In addition, it is also advantageous when the antenna unit is designed such that both the first emitting element and the second emitting element are fed by the aperture coupling.

According to a particularly preferred configuration, the antenna unit has the following structure:
PCB metallization with feed line
Board substrate material
PCB metallization with ground plane and opening
Board substrate material
PCB metallization with first emitting element in the form of a patch
Housing-process window (e.g. made of PEEK)
Metallization with a second emitting element in the form of a patch According to a further configuration, the sensor housing has a threading for connection to a container wall.

The invention also relates to an arrangement comprising a container for receiving a medium and a fill level switch described above, wherein the fill level switch is mounted in the container wall. The container may be, for example, at least partially made of a metal and/or at least partially made of a plastic.

According to one configuration, the fill level switch is screwed into the container wall. For this, the sensor housing has a threading which is screwed into an installation socket, wherein the first emitting element is preferably flush with the inner container wall. In addition, it is also conceivable that the first emitting element preferably protrudes, by means of different screw-in depths, into the interior of the container or is sunk in the container wall.

Alternatively, the installation socket can have a fixed extension, so that the sensor unit is spaced from the container wall, in particular over a length of between 0 and 50 cm. This does not contradict the measuring principle described above, as long as it is ensured that the medium touches the sensor, in detail the first emitting element, during operation, for example, when reaching the limit level.

According to one configuration of the arrangement, the sensor unit is aligned horizontally.

According to a next configuration, the sensor unit is vertically aligned and arranged at the upper end of the container. In this arrangement, the fill level switch serves as overflow protection.

According to a next configuration, the sensor unit is vertically aligned and arranged at the lower end of the container. In this arrangement, the fill level switch serves a dry-run protection.

According to a second teaching of the invention, the problem set out at the beginning is solved by a method mentioned at the outset in such a manner that the emitting element is fed by the feed line via an aperture coupling during operation, wherein the reference surface has at least one opening as passage for the electromagnetic signal and wherein the first emitting element is arranged such that it has direct contact with the medium during operation, and that the method comprises the following steps:
generating and feeding an electromagnetic signal into the emitting element via the aperture coupling,
transmitting a first electromagnetic transmission signal directly into the container and measuring the power reflected at the emitting element,
evaluating the measured power at a frequency or in a frequency interval.

The method according to the invention has the advantage that, due to the direct coupling of the first transmission signal into the container, the limit level of media having particularly low dielectric numbers can be monitored. Thus, the method according to the invention is particularly sensitive. In addition, the method can also be used in those cases in which particularly high demands are placed on the fill level switch in terms of pressure resistance and resistance to diffusion-friendly media.

According to a particularly preferred implementation, the fill level switch is designed according to one of the previously described configurations.

According to a further advantageous implementation, at least a second emitting element is present, which is fed via the aperture coupling, wherein the electromagnetic signal is generated in a first step and coupled via the aperture coupling into the emitting elements, wherein the first emitting element emits a first electromagnetic transmission signal having a first frequency directly into the container and the second emitting element simultaneously emits a second electromagnetic transmission signal with a second frequency into the container, wherein the powers reflected at the first emitting element and the second emitting elements are measured and wherein the measured powers are then evaluated at two defined frequencies or in a frequency interval.

In detail, there is a plurality of possibilities for designing and further developing the fill level switch according to the invention and the method according to the invention. For this, reference is made to both the patent claims subordinate to the independent patent claims as well as to the following description of preferred embodiments in conjunction with the accompanying drawings.

BRIEF DESCRIPTION OF THE DRAWINGS

FIG. 7 is a fourth embodiment of a fill level switch in accordance with the invention in the mounted state, FIG. 8a is a first arrangement of a first emitting element and a second emitting element, FIG. 8b is a second arrangement of a first emitting element and a second emitting element.

DETAILED DESCRIPTION OF THE INVENTION

Figure 1:
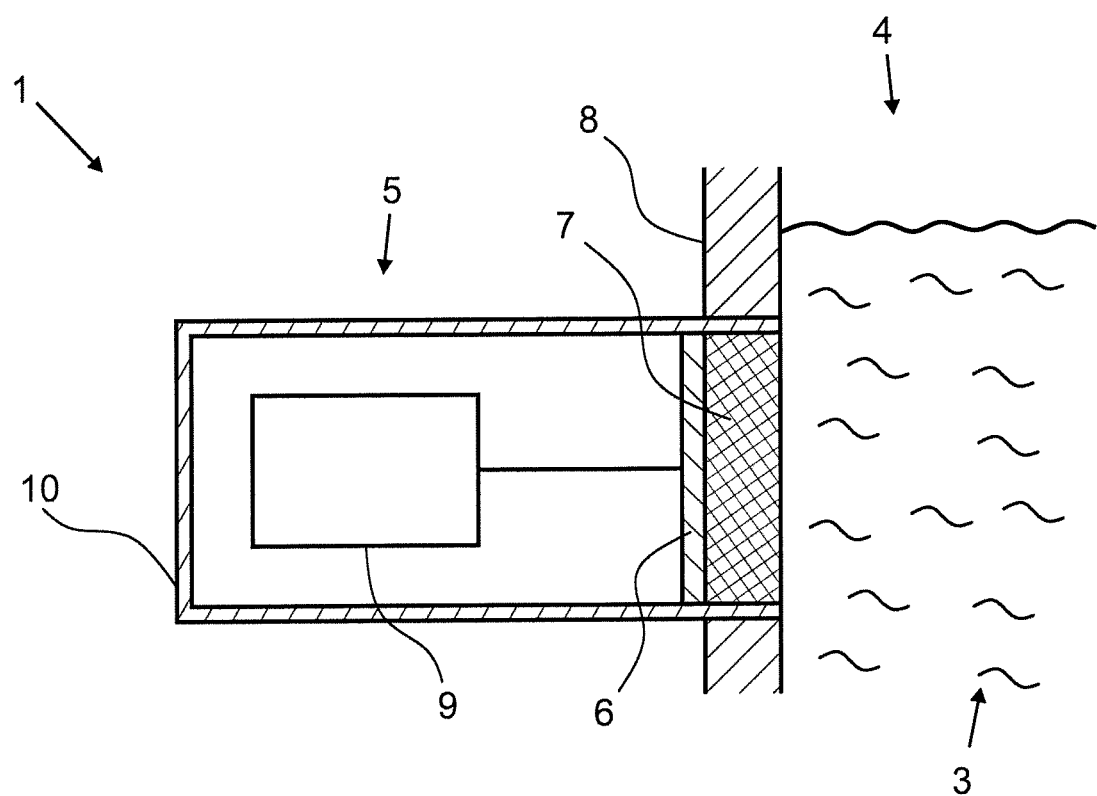
FIG. 1 shows a fill level switch mounted into the side wall of a container from the prior art.

FIG. 1 shows an embodiment of a fill level switch 1 for determining a limit level of a medium 3 in a container 4 from the prior art. The fill level switch 1 has a sensor unit 5, wherein the sensor unit 5 has an antenna unit 6, a process window 7 for protecting the sensor unit 5 and for connection to the container wall 8, an electronics unit 9 and a sensor housing 10.

The antenna unit 6 comprises a first emitting element 11a for emitting a first electromagnetic transmission signal. In this case, the antenna unit 6 and, in particular, also the emitting element 11a are arranged behind the process window 7 on the medium side.

Figure 2:
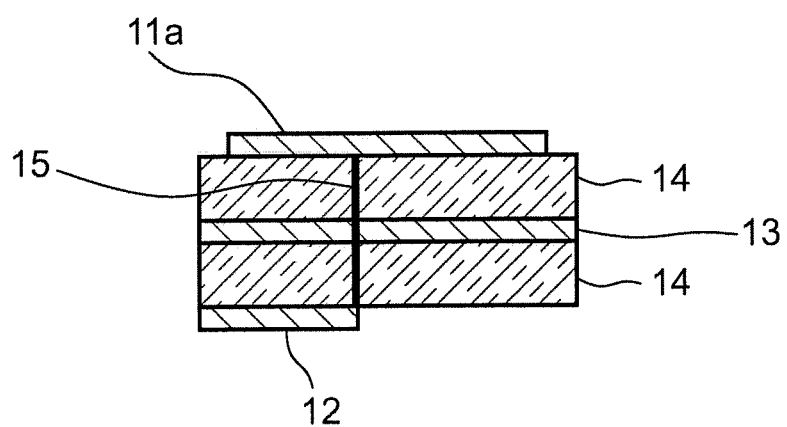
FIG. 2 shows a first antenna arrangement from the prior art.

The antenna unit 6 is configured as shown in FIG. 2.

In detail, a feed line 12 connected to the electronic unit 9 and a reference surface 13 having a reference potential are present in the form of a defined ground plane. A dielectric layer 14 between the reference surface 13 and the emitting element 11a and a dielectric layer 14 between the feed line 12 and the reference surface 13 are also present. The coupling of the electromagnetic signal into the emitting element 11 takes place via a line 15.

Figure 4:
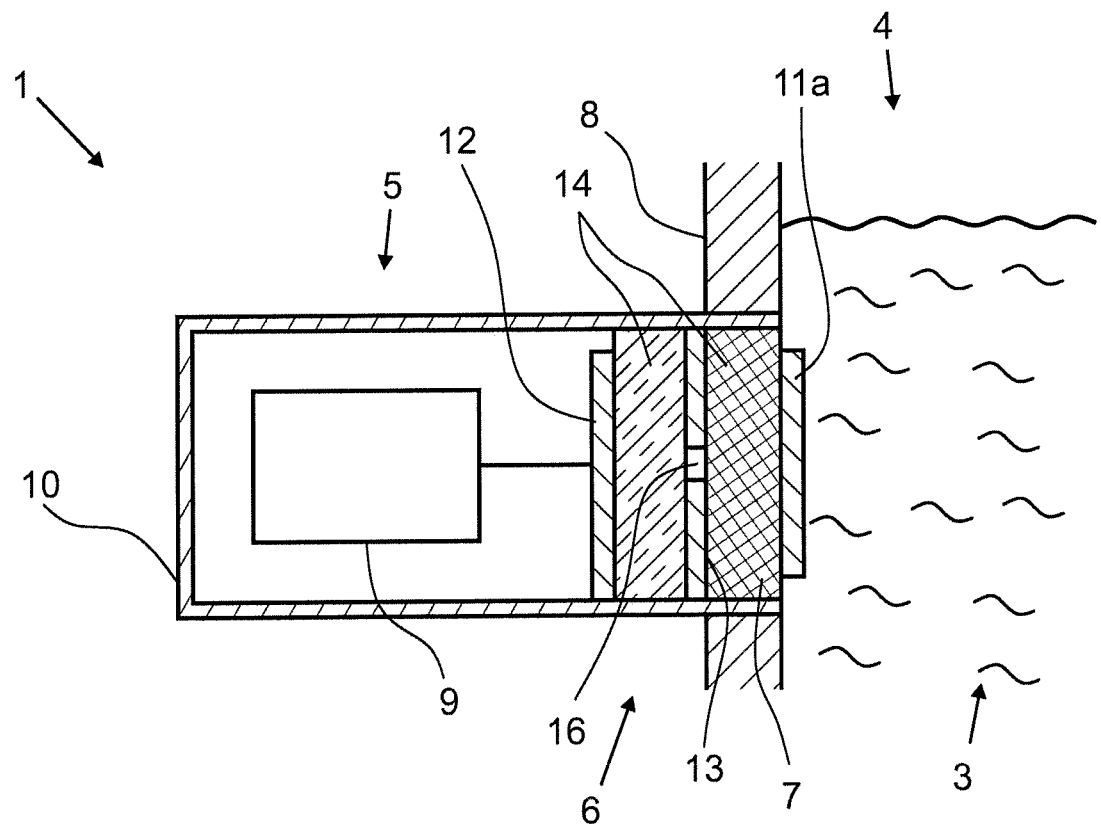
FIG. 4 is a first embodiment of a fill level switch in accordance with the invention in the mounted state, FIG. 5 a second embodiment of a fill level switch in accordance with the invention in the mounted state.

FIG. 4 shows a first embodiment of a fill level switch 1, wherein the level switch 1 is mounted in the side wall 8 of a container 4 and thus monitors when a limit level of the medium 3 in the container 4 is reached.

Figure 3:
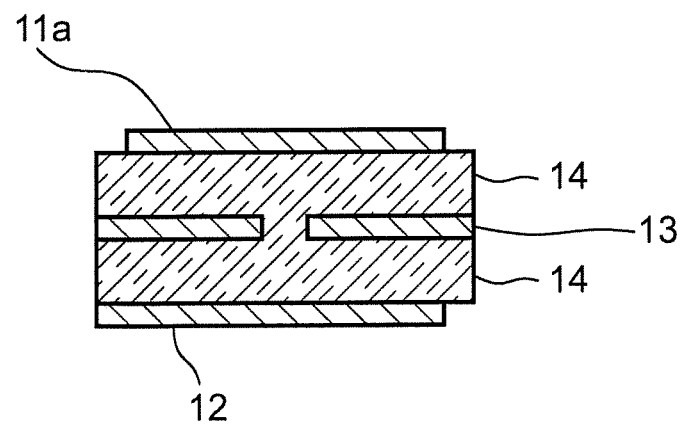
FIG. 3 shows a second antenna arrangement from the prior art.

For this, the fill level switch 1 has a sensor unit 5, wherein the sensor unit 5 has an antenna unit 6, a process window 7 for protecting the sensor unit 5 and for connection to the container wall 8, an electronics unit 9 and a sensor housing 10. The antenna unit 6 is configured as shown in FIG. 3 and accordingly has an emitting element 11a for emitting a first electromagnetic transmission signal, a feed line 12 connected to the electronic unit 9, a reference surface 13 having a reference potential in the form of a defined ground plane, a dielectric layer 14 between the reference surface 13 and the feed line 12 and a dielectric layer 14 between the reference surface 13 and the emitting element 11a. The emitting element 11a is fed with the electromagnetic signal via an aperture coupling. For this, the reference surface 13 has an opening 16 as passage for the electromagnetic signal.

The emitting element 11a is arranged in the illustrated embodiment such that it has direct contact with the medium 3, at least when reaching the limit level. This has the advantage that the fill level switch 1 has a particularly high sensitivity. In addition, the dielectric layer 14 arranged between the emitting element 11a and the reference surface 13 is designed as a process window 7.

The process window 7 is permeable for the electromagnetic signal to be coupled into the emitting element 11a. In the present case, the process window 7 consists of PEEK. Due to the aperture coupling, it is not necessary that the process window 7 is made particularly thin. Thus, the illustrated embodiment is also suitable for applications in which the fill level switch 1 is exposed to high process pressures or chemical diffusion-friendly media.

In the illustrated arrangement of the fill level switch 1 mounted in the side wall 8 of the container 4, the emitting element 11 protrudes slightly into the container interior. The fill level switch 1 is screwed into the side wall 8. For this, the sensor housing 10 has a threading which is screwed into an installation socket.

Figure 5:
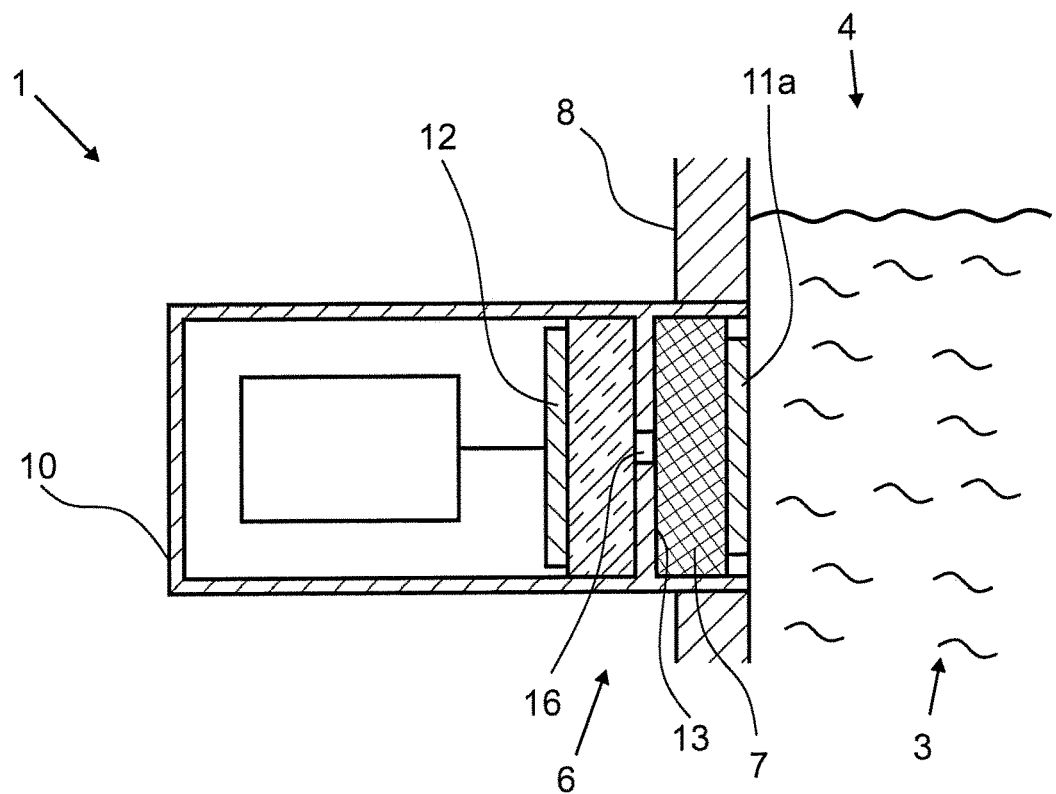

FIG. 5 shows a further embodiment of a fill level switch 1, which is configured in the side wall 8 of a container 4 for receiving a medium 3. In contrast to the embodiment illustrated in FIG. 4, the reference surface 13 is a part of the sensor housing 10. In the region of the reference surface 13, the sensor housing 10 therefore has an opening 16 as passage for the electromagnetic signal. In this case, the sensor housing 10 has no defined electrical potential. In addition, the sensor housing 10 is made of a metal. This embodiment of the level switch 1 is particularly suitable for applications in which the level switch 1 is exposed to high process pressures or chemically diffusion-friendly media, since both the process window 7 and the sensor housing 10 protect the sensor unit 5.

In addition, the level switch 1 is screwed into the side wall 8 of the container 4 such that the emitting element 11a is flush with the inside of the container wall 8.

Figure 6:
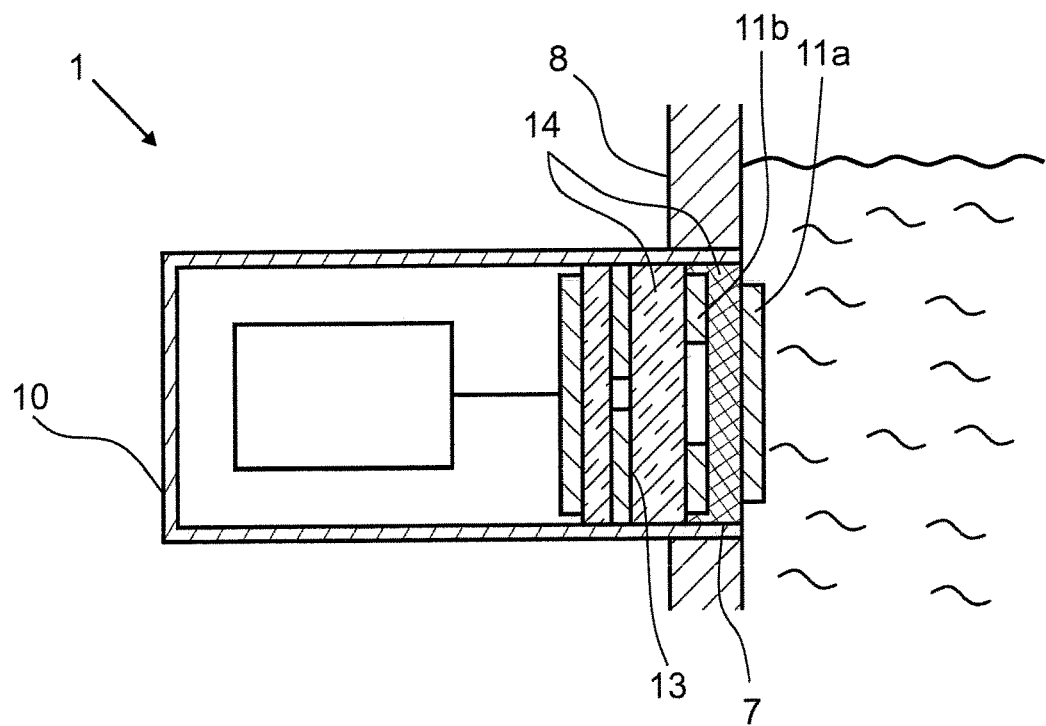
FIG. 6 is a third embodiment of a fill level switch in accordance with the invention in the mounted state.

FIG. 6 shows a further embodiment of a fill level switch 1, which is arranged in the side wall 8 of a container 4. In contrast to the embodiments described above, a second emitting element 11b is provided, which is arranged parallel to the first emitting element 11a. Both emitting elements 11a and 11b are fed via an aperture coupling. The second emitting element 11b is designed annular, the first emitting element 11a has a solid surface.

The embodiment shown in FIG. 7 corresponds with respect to the arrangement of the emitting elements 11a and 11b to the embodiment shown in FIG. 6. In addition, a part of the sensor housing 10 is designed as a reference surface 13.

FIG. 8a shows an arrangement of a first emitting element 11a and a second emitting element 11b, wherein the emitting elements 11a and 11b are designed as shown in FIG. 7. The first emitting element 11a is of circular design and the second emitting element arranged behind the process window 7 is annular.

FIG. 8b shows an alternative embodiment of the emitting elements 11a and 11b. The first emitting element 11a is H-shaped and has a resonance frequency of 5.8 GHz in air. The second emitting element 11b is rectangular in shape and has a resonant frequency of 8 GHz in air.

Figure 9:
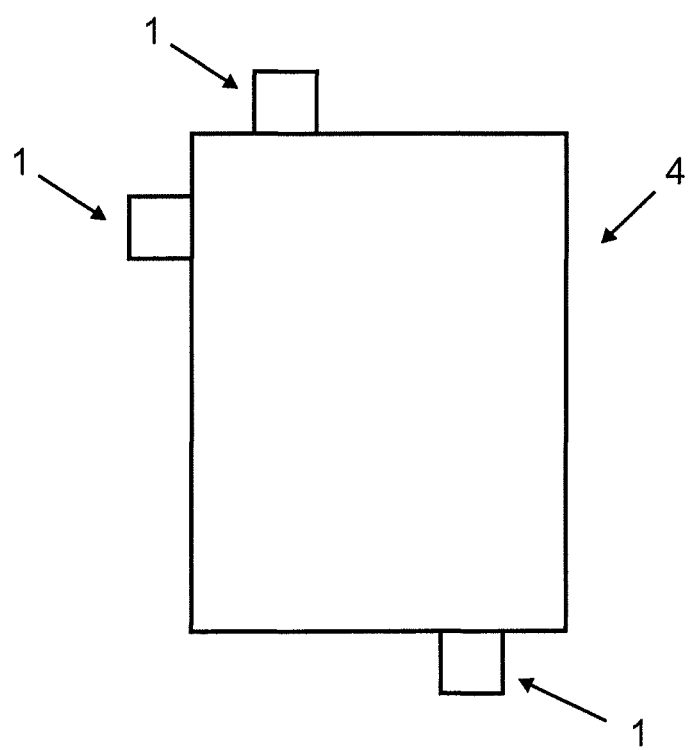
FIG. 9 is a possible arrangement of the fill level switch in the container.

FIG. 9 shows possible arrangements of the fill level switch 1 on the container 4. It is shown that the fill level switch 1 can be installed both horizontally and vertically at the top and/or at the bottom of the container.

Figure 10:
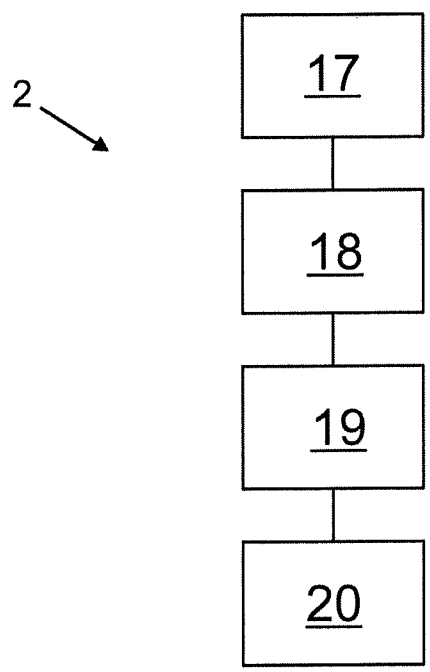
FIG. 10 is a first embodiment of a method according to the invention.

FIG. 10 shows a first embodiment of a method 2 according to the invention for determining a limit level of a medium 3 in a container 4 with a fill level switch 1 shown in FIG. 4.

In a first step 17, an electromagnetic signal is generated and coupled via the aperture coupling in the emitting element 11a.

In a second step 18, the first electromagnetic transmission signal is transmitted directly into the container or into the medium by the emitting element 11a and the power reflected at the emitting element 11a is measured.

In a next step 19, the evaluation of the measured power takes place in a frequency interval.

The measured value of the reflected power or the course of the power over the frequency is compared with the power curve in the starting situation in a further step 20 for determining whether the limit level has been reached. The initial situation when monitoring an upper limit level corresponds to the state that no medium is present at the fill level switch. When monitoring a lower limit level, the initial situation corresponds to the state that a medium is present at the level switch.

Figure 11:
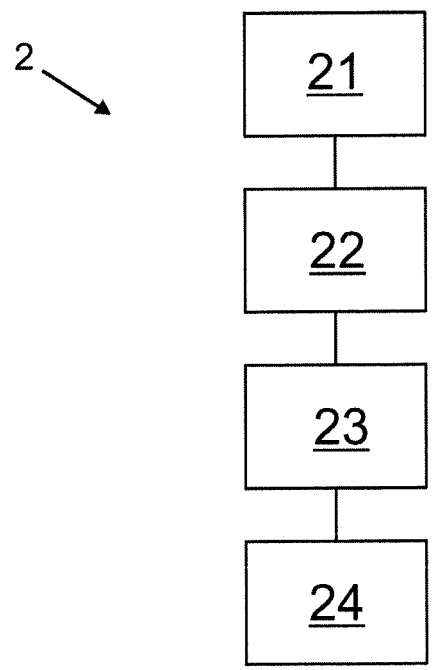
FIG. 11 is a second embodiment of a method according to the invention.

FIG. 11 shows a second embodiment of a method 2 for determining a limit level of a medium 3 in a container 4, wherein the fill level switch 1 is designed according to the embodiment illustrated in FIG. 6.

In a first step 21, an electromagnetic signal is generated and coupled into the emitting elements 11a and 11b via the aperture coupling. In a second step 22, the emitting element 11a transmits a first electromagnetic signal at a first frequency directly into the container, and the second emitting element 11b transmits a second electromagnetic transmission signal at a second frequency into the container, and then the powers reflected at the first emitting element 11a and at the second emitting element 11b are measured.

In a next step 23, the evaluation of the power of the reflection signals takes place in a frequency interval.

The measured values of the reflected power or the course of the powers over the frequency is compared with the corresponding power curve in the starting situation in a further step 24 for determining whether the limit level has been reached. The initial situation when monitoring an upper limit level corresponds to the state that no medium is present at the fill level switch. When monitoring a lower limit level, the initial situation corresponds to the state that a medium is present at the fill level switch.

As a result, due to the flexible sensitivity, both media with low dielectric constants and media with widely differing, i.e., small and large, dielectric constants can be monitored with this method.

What is claimed is:

1. A fill level switch for determining a level limit of a medium in a container, comprising:
   at least a sensor unit having at least an antenna unit, at least a process window for protecting the sensor unit and, at least an electronic unit for determining if a limit level of the medium in the container has been reached and at least a sensor housing for connection to a container wall,
   wherein the antenna unit has at least a first emitting element for emitting a first electromagnetic transmission signal, at least a feed line connected to said electronic unit, at least a reference surface having a reference potential and at least one dielectric layer, wherein the process window is comprised of the dielectric layer which is arranged between the reference surface and the emitting element,
   wherein an aperture coupling is provided in the reference surface via which the emitting element is fed by the feed line during operation,
   wherein the aperture coupling comprises an opening for passage of the electromagnetic transmission signal from the feed line via the dielectric layer to the emitting element, and
   wherein the first emitting element is arranged on an end of the sensor unit such that it is able to have direct contact with the medium during operation in an installed condition of the sensor unit connected to the container wall.

2. The fill level switch according to claim 1, wherein the emitting element is configured as a planar antenna surface or as an array of at least two planar antenna surfaces.

3. The fill level switch according to claim 1, wherein the dielectric layer is arranged between the reference surface and the emitting element and comprises the process window.

4. The fill level switch according to claim 1, wherein the process window is permeable to the frequency of the electromagnetic transmission signal.

5. The fill level switch according to claim 1, wherein the process window is formed at least partially of plastic, glass or ceramic.

6. The fill level switch according to claim 1, wherein the process window is formed at least partially of PEEK or PTFE.

7. The fill level switch according to claim 1, wherein a part of the sensor housing is configured as the reference surface, wherein the sensor housing has at least an opening as a passage for the electromagnetic signal in a region of the reference surface.

8. The fill level switch according to claim 1, wherein the sensor housing has a defined ground potential.

9. The fill level switch according to claim 1, wherein the antenna unit has at least a second emitting element for emitting a second electromagnetic signal, and wherein the first and the second emitting elements are arranged in different planes on the end of the sensor unit.

10. The fill level switch according to claim 9, wherein the second emitting element is arranged parallel to the first emitting element.

11. The fill level switch according to claim 9, wherein the second emitting element is arranged between the process window and the reference surface.

12. The fill level switch according to claim 9, wherein the first emitting element and the second emitting element have at least one of different sizes or different shapes.

13. The fill level switch according to claim 1, wherein the opening of the reference surface is configured as one of slot-shaped, dumbbell-shaped or T-shaped.

14. The fill level switch according to claim 1, wherein the feed line is one of T-shaped or dumbbell-shaped.

15. The fill level switch according to claim 9, wherein the first emitting element and the second emitting element are arranged so as to be fed by the aperture coupling.

16. A method for determining a limit level of a medium in a container with a fill level switch having at least a sensor unit, wherein the sensor unit has at least an antenna unit, at least a process window for protecting the sensor unit, at least an electronic unit and at least a sensor housing for connection to the container wall, wherein the antenna unit has at least a first emitting element on an end of the sensor unit for transmission of a first electromagnetic transmission signal, at least a feed line and at least a reference surface having reference potential, wherein the process window is a dielectric layer that is arranged between the reference surface and the emitting element,
   wherein the emitting element being fed by the feed line via an aperture coupling, the aperture coupling comprising at least an opening in the reference surface for passage of the electromagnetic signal from the feed line through the process window to the first emitting element, the method comprising the following steps:
   arranging the first emitting element so as to have direct contact with the medium during operation,
   generating and feeding an electromagnetic signal into the emitting element via the aperture coupling and process window, transmitting a first electromagnetic transmission signal directly into the container and measuring the power reflected at the emitting element, and evaluating the measured power at a frequency or in a frequency interval to determine if a limit level of the medium in the container has been reached.

17. The method according to claim 16, wherein at least a second emitting element is provided on the end of the sensor unit and which is fed via the aperture coupling, wherein the electromagnetic signal generated is coupled from the feed line into the emitting elements via the aperture coupling and process window, wherein the first emitting element emits a first electromagnetic transmission signal with a first frequency directly into the container and the second emitting element, at the same time, emits a second electromagnetic transmission signal with a second frequency into the container, wherein the power reflected to the first emitting element and to the second emitting element are measured and wherein, subsequently, the measured powers are evaluated at two defined frequencies or in a frequency interval.

* * * * *